United States Patent [19]

Ueno et al.

[11] Patent Number: 4,504,639

[45] Date of Patent: Mar. 12, 1985

[54] PROCESS FOR POLYMERIZING 1,3-BUTADIENE

[75] Inventors: Haruo Ueno, Chiba; Hidetomo Ashitaka, Ichihara; Kazuya Jinda, Kisarazu; Kouichi Nakajima, Chiba, all of Japan

[73] Assignee: Ube Industries, Ltd., Chiba, Japan

[21] Appl. No.: 409,607

[22] Filed: Aug. 19, 1982

[30] Foreign Application Priority Data

Aug. 27, 1981 [JP] Japan ............................ 56-133249

[51] Int. Cl.$^3$ .................................................. C08F 4/72
[52] U.S. Cl. .................................... 526/146; 525/247
[58] Field of Search ................... 526/146, 79; 525/247

[56] References Cited

U.S. PATENT DOCUMENTS 4,340,685  7/1982  Takeuchi et al. ..................... 526/79
4,379,889  4/1983  Ashitaka et al. ..................... 525/247

FOREIGN PATENT DOCUMENTS 116708  9/1981  Japan .................................. 526/146

*Primary Examiner*—Paul R. Michl
*Attorney, Agent, or Firm*—Ryan and Wayne Burgess

[57] ABSTRACT

A process for polymerizing 1,3-butadiene, comprising bring into contact a 1,2-polymerization catalyst consisting essentially of a soluble cobalt compound, an organic aluminum halide, an organic lithium compound, and carbon disulfide or phenyl isothiocyanate with 1,3-butadiene in a polymerization medium. The process can be applied particularly advantageously in the preparation of 1,2-polybutadiene, and the resultant 1,2-polybutadiene has a content of syndiotactic 1,2-structural units of not less than 90%, a melting point of 200° C. to 220° C., and an intrinsic viscosity $[\eta]$ of 1.2 to 7.

26 Claims, No Drawings

PROCESS FOR POLYMERIZING 1,3-BUTADIENE

The invention relates to a process for polymerizing 1,3-butadiene. More particularly, the invention relates to a process for preparing 1,2-polybutadiene by polymerizing 1,3-butadiene.

It has hitherto been known that high-melting point 1,2-polybutadiene can be obtained by polymerizing 1,3-butadiene using a catalyst consisting of a soluble cobalt compound, a trialkylaluminum, and carbon disulfide or phenyl isothiocyanate. It has also been known that cis-1,4-polybutadiene can be obtained by polymerizing 1,3-butadiene using a catalyst consisting of a soluble cobalt compound and an organic aluminum halide. However, it had not been known to employ an organic aluminum halide as the organic aluminum compound component of a catalyst in the production of 1,2-polybutadiene until we proposed, in Japanese patent application No. 54-164772, the production of 1,2-polybutadiene by polymerizing 1,3-butadiene in the presence of a catalyst consisting of a soluble cobalt compound, a dialkylaluminum halide, carbon disulfide, and an electron-donating organic compound.

The process for the polymerization of 1,3-butadiene by the use of the above-mentioned catalyst of a soluble cobalt compound, a dialkylaluminum halide, carbon disulfide, and an electron-donating organic compound has, however, a drawback in that the polymerization activity of the catalyst is inferior or the intrinsic viscosity $[\eta]$ (i.e., the molecular weight) of the resultant 1,2-polybutadiene is relatively low, as compared with the process for the polymerization of 1,3-butadiene by the use of the hereinbefore-mentioned catalyst of a soluble cobalt compound, a trialkylaluminum, and carbon disulfide. The "polymerization activity" as used herein refers to a polymer yield per unit time per unit soluble cobalt compound, and the "intrinsic viscosity" refers to a value determined at 135° C. in tetralin unless otherwise stated.

We have made extensive studies to develop a process for preparing 1,2-polybutadiene having an intrinsic viscosity of not lower than 1.2 in which a catalyst containing an organic aluminum halide as the organic aluminum compound component has a high activity in the polymerization of 1,3-butadiene and attained the present invention as a result of the studies.

Thus, the present invention provides a process for polymerizing 1,3-butadiene, which comprises bringing into contact a 1,2-polymerization catalyst consisting essentially of a soluble cobalt compound, an organic aluminum halide, an organic lithium compound, and carbon disulfide or phenyl isothiocyanate with 1,3-butadiene in a polymerization medium.

In another aspect of the present invention, there is thus provided a process for preparing 1,2-polybutadiene which comprises polymerizing 1,3-butadiene in a polymerization medium in the presence of a 1,2-polymerization catalyst consisting essentially of a soluble cobalt compound, an organic aluminum halide, an organic lithium compound, and carbon disulfide or phenyl isothiocyanate.

As the soluble cobalt compound of a component of the catalyst useful for the present invention, any cobalt compounds may be used so far as they are soluble in the polymerization medium employed. Preferred examples of such soluble cobalt compounds include β-diketone complexes of cobalt and β-ketonic acid ester complexes of cobalt. As the β-diketone of the ligand of the former complexes, there may be mentioned β-diketones of the general formula

in which $R_1$ and $R_2$ each independently represent a hydrogen atom or an aliphatic hydrocarbon radical having 1 to 3 carbon atoms, and $R_3$ and $R_4$ each independently represent an aliphatic hydrocarbon radical having 1 to 3 carbon atoms. As the β-ketonic acid ester of the ligand of the latter complexes, there may be mentioned β-ketonic acid esters of the general formula

in which $R_1$, $R_2$, $R_3$, and $R_4$ are as defined above. Particularly preferred complexes are cobalt (II) acetylacetonato, cobalt (III) acetylacetonato, and cobalt-acetoacetic acid-ethyl-ester complexes.

Further examples of the soluble cobalt compounds include cobalt salts of organic carboxylic acids having 6 or more carbon atoms such as cobalt octoate, cobalt naphthenate, and cobalt benzoate.

Still further examples of the soluble cobalt compound include halogenated cobalt complexes of the general formula $$CoX_l \cdot Y_m \quad (3)$$

in which X represents a halogen atom, preferably chlorine, l is an integer of 2 or 3, Y is a ligand, and m is an integer of 1 to 4. As the ligand in the above formula (3), there may be mentioned any ligands known as being capable of forming complexes with a cobalt halide, for example, amines such as pyridine, triethylamine, tributylamine, and dimethylaniline, alcohols such as methyl alcohol and ethyl alcohol, and amides such as N,N-dimethylformamide, N,N-dimethylacetamide, N,N-diethylformamide, N-methylpyrolidone, pyrrolidone, and caprolactam. Particularly preferred halogenated cobalt complexes are cobalt-chloride-pyridine complex and cobalt-chloride-ethyl alcohol complex.

Still further examples of the soluble cobalt compound include cobalt complexes of olefins and diolefins, such as tris-π-allylcobalt, bisacrylonitrile-π-allylcobalt, bis-π-1,5-cyclooctadiene-tert-butyl-isonitrilecobalt, π-cyclooctenyl-π-1,5-cyclooctadienecobalt, π-1,3-cycloheptadienyl-π-1,5-cyclooctadienecobalt, bicyclo[3,3,0]octadienyl-1,5-cyclooctadienecobalt, bis-(π-allyl)cobalthalide (the halogen is selected from chlorine, bromine, and iodine), bis-(π-1,5-cyclooctadiene)ethylcobalt, and (1,3-butadiene)[1-(2-methyl-3-butenyl)-π-allyl]cobalt.

The organic aluminum halide useful for the present invention includes organic aluminum halides of the general formula $$AlR_nX_{3-n}$$

in which R is an alkyl, aryl, or cycloalkyl radical, X is a halogen atom, and n is a number of 1 to 2. As the preferred organic aluminum halide, there may be mentioned diethylaluminum monochloride, diethylaluminum monobromide, diisobutylaluminum monochloride, ethylaluminum sesquichloride, and ethylaluminum dichloride.

The organic lithium compound includes alkyl lithium compounds, aryl lithium compounds, alkylene dilithium compounds, and arylene dilithium compounds. Particularly preferred organic lithium compounds are alkyl lithium compounds such as ethyllithium, propyllithium, n-butyllithium, sec-butyllithium, tert-butyllithium, and amyllithium.

As the fourth component of the catalyst useful for the present invention, there is employed carbon disulfide or phenyl isothiocyanate, preferably carbon disulfide.

The respective soluble cobalt compounds, organic aluminum halides, and organic lithium compounds may be employed in the catalyst either alone or as a mixture of two or more thereof. Likewise, the fourth component may exist in the catalyst as a mixture of carbon disulfide and phenyl isothiocyanate. The polymerization catalyst useful for the present invention may further contain other minor components unless they deleteriously affect the polymerization activity of the catalyst.

In the process according to the present invention, the polymerization of 1,3-butadiene should be carried out in the presence of a four-component-system catalyst consisting essentially of a soluble cobalt compound, an organic aluminum halide, an organic lithium compound, and carbon disulfide or phenyl isothiocyanate. If the polymerization of 1,3-butadiene is carried out in the presence of a catalyst consisting of the above-mentioned components other than the organic lithium compound, it is not possible to obtain high-melting point and high-molecular weight 1,2-polybutadiene having a high activity (see Comparative Example 1). Likewise, if the polymerization of 1,3-butadiene is carried out in the presence of a catalyst consisting of the above-mentioned components other than the organic aluminum halide, high-melting point and high-molecular weight 1,2-polybutadiene cannot be obtained (see Comparative Example 2).

In the process according to the present invention, the respective components of the catalyst may be added in any order to the polymerization medium. However, it is preferable that the respective components be added to the polymerization medium in which 1,3-butadiene has been dissolved, with the organic aluminum halide or the organic lithium compound being firstly added and the soluble cobalt compound and then the carbon disulfide or phenyl isothiocyanate being finally added.

The polymerization medium usable for the present invention includes aromatic, aliphatic, and alicyclic hydrocarbons such as benzene, toluene, xylene, hexane, heptane, butane, butene, cyclohexane, and cyclopentane. Preferably, the polymerization medium is dehydrated so as to adjust the moisture content to about 50 ppm. particularly about 30 ppm. In particular, in the case where a monohalide is employed as the organic aluminum halide, it is preferable, in order to improve the polymerization activity of the catalyst, that water be present in the polymerization medium in an amount as small as 3 to 50 ppm, particularly 3 to 30 ppm.

Also, it is preferable, in order to improve the polymerization activity of the catalyst, that an organic carboxylic acid be present in the polymerization medium in an amount of about 3 to 200 ppm, particularly about 3 to 100 ppm. Examples of the organic carboxylic acid include aliphatic carboxylic acids such as acetic acid, propionic acid, caproic acid, laulic acid, myristic acid, stearic acid, behenic acid, oleic acid, sorbic acid, linoleic acid, aromatic carboxylic acids such as benzoic acid and phthalic acid, and naphthenic acid.

It is preferable that the respective catalyst components be used in the following amounts, based on the 1,3-butadiene to be polymerized: 0.0005 to 0.1 mol% of the soluble cobalt compound, 0.01 to 1 mol% of the organic aluminum halide, 0.01 to 1 mol% of the organic lithium compound, and 0.001 to 1 mol% of the carbon disulfide or phenyl isothiocyanate. In turn, it is preferable that the organic aluminum halide be used in an amount of 10 to 500 moles, more preferably 20 to 200 moles per mol of the soluble cobalt compound, that the organic lithium compound be used in an amount of 5 to 200 moles, more preferably 10 to 100 moles per mol of the soluble cobalt compound, and that the carbon disulfide or phenyl isothiocyanate be used in an amount of 0.1 to 500 moles, more preferably 1 to 500 moles per mol of the soluble cobalt compound.

When a compound of the general formula $AlR_{1.5}X_{1.5}$ in which R and X are as defined above, e.g., ethylaluminum sesquichloride, is employed as the organic aluminum halide, it is preferable that the organic lithium compound be used in an amount of not less than 0.5 moles per mol of the organic aluminum halide.

Further, it is preferable that the amount of the organic lithium compound be not less than 1 mol per mol of water in total existing in the polymerization system.

The concentration of 1,3-butadiene in the polymerization solution is not critical in the process according to the present invention. However, it is preferable in general that the concentration be 5% to 30% by weight based on the weight of the polymerization solution.

The polymerization temperature may preferably be $-10°$ C. to 80° C., particularly 20° C. to 60° C., and the polymerization pressure may be atmospheric or higher.

The 1,2-polybutadiene obtained by the polymerization of 1,3-butadiene according to the process of the present invention has a content of syndiotactic 1,2-structural units of not less than 90%, a melting point of 200° C. to 220° C., and an intrinsic viscosity $[\eta]$ of 1.2 to 7. The 1,2-polybutadiene is useful as a thermofusion bonding agent or as raw materials for various plastic articles.

The process according to the present invention can be applied to two-stage polymerization in which 1,3-butadiene is polymerized in the presence of a catalyst prepared from a soluble cobalt compound and an organic aluminum halide to obtain cis-1,4-polybutadiene, and subsequently 1,3-butadiene is subjected to 1,2-polymerization, in the polymerization system, in the presence of the catalyst useful in the process of the present invention.

Further, the process according to the present invention can be applied to two-stage polymerization in which 1,3-butadiene, isoprene, or a mixture of styrene and 1,3-butadiene is subjected to ionic polymerization or copolymerization in the presence of an organic lithium compound to obtain a rubber such as polybutadiene, polyisoprene or a styrene-butadiene copolymer, and subsequently, in the polymerization system, 1,3-butadiene is subjected to 1,2-polymerization in the presence of the catalyst useful in the process of the present invention. The polymers thus produced may be utilized for various products and are particularly useful for tires. If isoprene is used at the first stage of two-stage polymerization, it is preferable that the amount of isoprene be adjusted to not more than 15% by mol of 1,3-butadiene before starting the second stage of polymerization.

Further, in two-stage polymerization, it is preferable that 1,3-butadiene be continued to be 1,2-polymerized until a polymerized rubber with an enhanced mechanical strength containing 5% to 30% by weight of boiling n-hexane-insoluble material (1,2-polybutadiene).

In the process according to the present invention, if the amount of 1,2-polybutadiene existing in the polymerization mixture as a result of 1,2-polymerization of 1,3-butadiene is too large, the viscosity of the polymerization mixture becomes so high that the polymerization mixture cannot be satisfactorily stirred. Therefore, it is desirable that the polymerization reaction of 1,3-butadiene be controlled so that the concentration of 1,2-polybutadiene in the polymerization mixture is maintained below a value of not more than about 170 g per liter of the polymerization mixture.

As to the termination of polymerization after the completion of the polymerization reaction, there can be applied known methods for the termination of polymerization by the use of a catalyst prepared from a soluble cobalt compound and an organic aluminum halide. For example, there can be employed for the termination of polymerization a method in which a large amount of a polar solvent such as an alcohol or water which is reactive with an organic aluminum compound is added to the polymerization mixture, a method in which the polymerization mixture is added to a large amount of such a polar solvent, a method in which a small amount of such a solvent containing an inorganic acid such as hydrochloric acid or sulfuric acid, monoethanolamine, or ammonia is added to the polymerization mixture, or a method in which a hydrogen chloride gas is introduced into the polymerization mixture.

After the termination of the polymerization of 1,3-butadiene, the polymerized 1,2-polybutadiene or rubber is separated from the polymerization mixture and is washed and dried in a usual manner to obtain 1,2-polybutadiene or a polymerized rubber.

The present invention will further be illustrated below by way of non-limitative examples. In the following examples, the contents of 1,2-structural units, cis-1,4-structural units, and trans-1,4-structural units of the polybutadienes were determined by means of a nuclear magnetic resonance (NMR) spectrum or an infrared (IR) spectrum. The melting point of 1,2-polybutadiene or the boiling n-hexane-insoluble material was determined according to the peak temperature of a heat-absorption curve by a self-recording differential scanning calorimeter (DSC). The intrinsic viscosity $[\eta]$ of 1,3-polybutadiene or the boiling n-hexane-insoluble material was determined at 135° C. in tetralin and the intrinsic viscosity of the boiling n-hexane-soluble material was determined at 30° C. in toluene.

EXAMPLE 1

A solution (containing 1.0 m mol of water) of 85 g of dry 1,3-butadiene in 860 ml of dehydrated benzene was introduced into a nitrogen-purged separable flask having an inner volume of 2 l and being provided with a thermometer, an agitator, and a nitrogen-introducing tube. While the temperature of the solution was maintained at 40° C., 4.0 m moles of diethylaluminum monochloride, 2.0 m moles of n-butyl lithium, 0.043 m moles of cobalt octoate, and 0.13 m moles of carbon disulfide were added, in that order, to the benzene solution of 1,3-butadiene while stirring it, and then the mixture was further stirred at 40° C. for 30 minutes to polymerize 1,3-butadiene. To the resultant polymerization mixture, 1 l of methanol containing a small amount of 2,6-di-tert-butyl-4-methylphenol and hydrochloric acid was added to terminate the polymerization reaction. The precipitated polymer was filtered off and dried in vacuo at 20 C. Thus, 33.7 g of polybutadiene was obtained.

The polybutadiene had a content of 1,2-structural units of 98.7%, a melting point of 205° C., and an intrinsic viscosity $[\eta]$ of 5.0.

COMPARATIVE EXAMPLE 1

The procedure of Example 1 was repeated except that n-butyl lithium was not added. Thus, 77 g of cis-1,4-polybutadiene having a content of cis-1,4-structural units of 97.8% was obtained.

EXAMPLE 2

The procedure of Example 1 was repeated except that the benzene solution of 1,3-butadiene contained 0.22 m moles of water instead of 1.0 m mol of water the amount of diethylaluminum monochloride was 2.0 m moles instead of 4.0 m moles, and the amount of n-butyl lithium was 1.0 m mol instead of 2.0 m moles. Thus, 28.6 g of polybutadiene was obtained.

The polybutadiene had a content of 1,2-structural units of 98.4%, a melting point of 204° C., and an intrinsic viscosity $[\eta]$ of 4.0.

COMPARATIVE EXAMPLE 2

The procedure of Example 1 was repeated except that the benzene solution of 1,3-butadiene contained water in a concentration of 0.05 m moles/l, and diethylaluminum monochloride was not added. Thus, 21.0 g of polybutadiene was obtained.

The polymer was soluble in n-hexane at room temperature and had an intrinsic viscosity (at 30° C. in toluene) of 0.43, a content of cis-1,4-structural units of 39.8%, a content of trans-1,4-structural units of 51.4%, and a content of 1,2-structural units of 8.8%.

EXAMPLE 3

The procedure of Example 1 was repeated except that the benzene solution of 1,3-butadiene contained 0.22 m moles of water instead of 1.0 m mol of water, 2 m moles of ethylaluminum sesquichloride was used instead of diethylaluminum monochloride, and the amount of n-butyl lithium was 1.5 m moles instead of 2.0 m moles. Thus, 27.3 g of polybutadiene was obtained.

The polybutadiene had a content of 1,2-structural units of 98.3%, a melting point of 207° C., and an intrinsic viscosity $[\eta]$ of 4.4.

EXAMPLE 4

The procedure of Example 1 was repeated except that the benzene solution of 1,3-butadiene contained 0.22 m moles of water instead of 1.0 m mol of water, and 2.0 m moles of ethylaluminum sesquichloride was used instead of diethylaluminum monochloride. Thus, 17.4 g of polybutadiene was obtained.

The polybutadiene had a content of 1,2-structural units of 98.5%, a melting point of 204° C., and an intrinsic viscosity $[\eta]$ of 3.6.

EXAMPLE 5

The procedure of Example 1 was repeated except that the catalyst components were added to the benzene solution of 1,3-butadiene in the order of n-butyl lithium, diethylaluminum monochloride, cobalt octoate, and carbon disulfide. Thus, 28.2 g of polybutadiene was obtained.

The polybutadiene had a content of 1,2-structural units of 98.3%, a melting point of 204° C., and an intrinsic viscosity $[\eta]$ of 4.4.

EXAMPLE 6

The procedure of Example 5 was repeated except that the benzene solution of 1,3-butadiene contained 0.7 m moles of acetic acid instead of 1.0 m mol of water. Thus, 27.5 g of polybutadiene was obtained.

The polybutadiene had a content of 1,2-structural units of 98.5%, a melting point of 205° C., and an intrinsic viscosity $[\eta]$ of 5.1.

EXAMPLE 7

The procedure of Example 2 was repeated except that the benzene solution of 1,3-butadiene contained 1.0 m mol of water, and 1.0 m mol of phenyl isothiocyanate was used instead of carbon disulfide. Thus, 1.4 g of polybutadiene was obtained.

The polybutadiene had a content of 1,2-structural units of 98.0%, a melting point of 208° C., and an intrinsic viscosity $[\eta]$ of 3.1.

EXAMPLE 8

A solution (containing 1.0 m mol of water) of 85 g of dry 1,3-butadiene in 860 ml of dehydrated benzene was introduced into a nitrogen-purged separable flask having an inner volume of 2 l and being provided with a thermometer, an agitator, and a nitrogen-introducing tube. While the temperature of the solution was maintained at 40° C., 4.6 m moles of cyclooctadiene, 4.0 m moles of diethylaluminum monochloride, and 0.043 m moles of cobalt octoate were added, in that order, to the benzene solution of 1,3-butadiene while stirring it, and then the mixture was further stirred at 40° C. for 10 minutes to subject 1,3-butadiene to cis-1,4-polymerization. Immediately thereafter, 2.0 m moles of n-butyl lithium and 0.13 m moles of carbon disulfide were added and then the mixture was further stirred at 40° C. for 8 minutes to subject 1,3-butadiene to 1,2-polymerization. The resultant polymerization mixture was then treated in the manner described in Example 1 to obtain 50.8 g of polybutadiene.

The polybutadiene contained 15.7% of boiling n-hexane-insoluble material, and the boiling n-hexane-insoluble material had a content of 1,2-structural units of 92.0%, a melting point of 204° C., and an intrinsic viscosity $[\eta]$ of 4.0 while the boiling n-hexane-soluble material had a content of cis-1,4-structural units of 96.2% and an intrinsic viscosity (at 30° C. in toluene) of 2.3.

EXAMPLE 9

A solution (containing not more than 0.1 m mol of water) of 208 g of dry 1,3-butadiene in 618 ml of dehydrated benzene was introduced into a nitrogen-purged glass autoclave having an inner volume of 1.2 l. While maintaining the temperature of the benzene solution of 1,3-butadiene at 40° C., 1.5 m moles of n-butyl lithium was added to the solution while stirring it, and the mixture was then stirred at 40° C. for a further 30 minutes to polymerize 1,3-butadiene. After polymerization, 1 m mol of water was added in the form of a saturated benzene solution and then 4.0 m moles of diethylaluminum monochloride, 0.043 m moles of cobalt caprylate, and 0.13 m moles of carbon disulfide were added successively and the mixture was stirred at 40° C. for 30 minutes to subject 1,3-butadiene to 1,2-polymerization. The resultant polymerization mixture was then treated in the manner described in Example 1 to obtain 59.4 g of polybutadiene.

The polybutadiene contained 14.4% of boiling n-hexane-insoluble material and had a content of 1,2-structural units of 93.0%, a melting point of 204° C., and an intrinsic viscosity $[\eta]$ of 1.4 while the boiling n-hexane-soluble material had a content of 1,2-structural units of 9.2%, a content of cis-1,4-structural units of 46.8%, a content of trans-1,4-structural units of 44.0%, and an intrinsic viscosity (at 30° C. in toluene) of 1.7.

In Examples 8 and 9, the boiling n-hexane-insoluble material and the boiling n-hexane-soluble material were separated from each other as follows.

2.000 g of the polybutadiene was precisely weighed and finely cut and then introduced into a conical flask having a volume of not less than 300 ml. Then 200 ml of n-hexane was added and the mixture was vigorously stirred. After confirming that a major part of the polybutadiene was dissolved and the insoluble particles had become sufficiently small, the liquid was filtered using a tubular glass filter cloth (No. 86, manufactured by Toyo Filter Paper Co. Ltd.). The residual n-hexane insoluble material was then extracted for 4 hours using a Soxhlet extractor, was washed with an n-hexane solution of 2,6-di-tert-butyl-4-methyl-phenol having a very low concentration, and was dried in vacuo. The filtrate, extractant, and washing liquid were collected and concentrated in an evaporator, and the residual n-hexane-soluble material was dried in vacuo.

In the following examples, the boiling n-hexane-insoluble material and the boiling n-hexane-soluble material were separated as mentioned above.

EXAMPLE 10

A solution (containing not more than 0.1 m mol of water) of 208 g of dry 1,3-butadiene in 618 ml of dehydrated benzene was introduced into a nitrogen-purged glass autoclave having an inner volume of 1.2 l. While maintaining the temperature of the benzene solution of 1,3-butadiene at 40° C., 1.5 m moles of n-butyl lithium was added to the solution while stirring it, and the mixture was stirred at 40° C. for 30 minutes to polymerize 1,3-butadiene. After polymerization, 1 m mol of water was added in the form of a saturated benzene solution and then 4.0 m moles of diethylaluminum monochloride, 0.043 m moles of cobalt octoate, and 0.13 m moles of carbon disulfide were added successively and the mixture was stirred at 40° C. for 30 minutes to subject 1,3-butadiene to 1,2-polymerization. To the resultant polymerization mixture, 10 ml of methanol containing 0.25 g of 2,6-di-tert-butyl-4-methylphenol was added to terminate polymerization. Then the polymerization mixture was poured into 1.5 l of methanol containing small amounts of hydrochloric acid and 2,6-di-tert-butyl-4-methylphenol to precipitate and collect the polymer. The polymer was then dried overnight at 40° C. with a vacuum dryer. Thus, 59.4 g of polybutadiene was obtained.

The polybutadiene contained 14.4% of boiling n-hexane-insoluble material which had a content of 1,2-structural units of 93.0%, a melting point of 204° C., and an intrinsic viscosity [η] of 1.4. On the other hand, the boiling n-hexane-soluble material had a content of 1,2-structural units of 9.2%, a content of cis-1,4-structural units of 46.8%, a content of trans-1,4-structural units of 44.0%, and an intrinsic viscosity (at 30° C. in toluene) of 1.7.

EXAMPLE 11

Into a reaction vessel which had been well dried and substituted with pure nitrogen, 0.28 m moles of sodium dodecylbenzenesulfonate was charged and then 750 ml of a benzene solution (containing not more than 0.05 m moles of water) containing 35 g of 1,3-butadiene which had been dried with molecular sieves was added. Thereafter, 11.2 g of styrene which had been well dried with molecular sieves and then distilled before polymerization was added. After adding 2.5 m moles of n-butyl lithium at 69° C., the mixture was allowed to be polymerized for 13 minutes. Then the temperature of the mixture was raised to 77° C. Next, 1 m mol of water was added in the form of a saturated benzene solution, and the mixture was cooled to about 20° C. 74.5 g of dry 1,3-butadiene was added, and the mixture was heated to 40° C. Then 4 m moles of diethylaluminum monochloride, 0.043 m mols of cobalt octoate, 0.13 m moles of carbon disulfide, and 1 m mol of n-butyl lithium were added successively and the mixture was allowed to be polymerized at 40° C. for 10 minutes. Next, the polymerization mixture was treated as described in Example 1 to collect the polymer.

The yield of the polymer was 48 g. The polymer contained 17% by weight of boiling n-hexane-insoluble material which had an intrinsic viscosity [η] of 4.2 and a melting point of 205° C. The boiling n-hexane-soluble material was styrene-butadiene rubber and had an intrinsic viscosity (at 30° C. in toluene) of 1.29 and a styrene content of 12.6 mol%.

EXAMPLE 12

Into a reaction vessel which had been well dried and substituted with pure nitrogen, 835 ml of benzene (containing not more than 0.05 m moles of water) containing 58 g of isoprene which had been dried with molecular sieves and distilled immediately before use was charged and then 1.2 m moles of n-butyl lithium was added at a temperature of 70° C. The temperature of the mixture was raised immediately to 80° C. due to the exothermic heat. The mixture was allowed to be polymerized at 80° C. for 45 minutes and benzene containing 1 m mol of water was added, then the mixture was cooled to 20° C. Gas chromatography measurement proved that isoprene did not substantially exist in the polymerization solution at this stage. To the mixture, 45 g of dry butadiene was added, and the mixture was heated to 40° C. Then 1.3 m moles of n-butyl lithium, 4 m moles of diethylaluminum monochloride, 0.043 m moles of cobalt octoate, and 0.13 m moles of carbon disulfide were added and the mixture was allowed to be polymerized at 40° C. for 10 minutes. Then the mixture was treated as described in Example 1 to collect the polymer.

The yield of the polymer was 59.5 g and the polymer contained 16% of boiling n-hexane-insoluble material having an intrinsic viscosity [η] of 5.7 and a melting point of 205° C. The boiling n-hexane-soluble material was polyisoprene having many cis-1,4-structural units and had an intrinsic viscosity (at 30° C. in toluene) of 1.05.

We claim:
1. A process for preparing polybutadiene with an enhanced mechanical strength containing 5% to 30% by weight of boiling n-hexane-insoluble fraction, comprising the successive steps of:
 (A) polymerizing 1,3-butadiene in the presence of a catalyst prepared from a soluble cobalt compound and an organic aluminum halide in a polymerization medium to obtain cis-1,4-polybutadiene; and
 (B) polymerizing 1,3-butadiene in the polymerization system, in the presence of a 1,2-polymerization catalyst consisting essentially of a soluble cobalt compound, an organic aluminum halide, an organic lithium compound, and carbon disulfide, phenyl isothiocyanate or mixture thereof wherein the soluble cobalt compound is used in an amount of 0.0005 to 0.1 mol%, the organic aluminum halide is used in an amount of 0.01 to 1 mol%, the organic lithium compound is used in an amount of 0.01 to 1 mol%, and the carbon disulfide or phenyl isothiocyanate is used in an amount of 0.001 to 1 mol%, based on the 1,3-butadiene to be polymerized.

2. A process as claimed in claim 1, where the soluble cobalt compound is selected from the group consisting of β-diketone complexes of cobalt, β-ketonic acid ester complexes of cobalt, cobalt salts of organic carboxylic acids, halogenated cobalt complexes, and cobalt complexes of olefins and diolefins.

3. A process as claimed in claim 1, wherein the organic aluminum halide is selected from the compounds of the general formula

in which R is an alkyl, aryl, or cycloalkyl radical, X is a halogen atom, and n is a number of 1 to 2.

4. A process as claimed in claim 1, wherein the organic lithium compound is selected from the group consisting of alkyl lithium compounds, aryl lithium compounds, alkylene dilithium compounds, and arylene dilithium compounds.

5. A process as claimed in claim 1, wherein carbon disulfide is employed as a component of the catalyst.

6. A process as claimed in claim 1, wherein the organic aluminum halide or the organic lithium compound is added to the polymerization medium containing dissolved 1,3-butadiene and the soluble cobalt compound and then the carbon disulfide of phenyl isothiocyanate is added.

7. A process as claimed in claim 1, wherein the organic aluminum halide is used in an amount of 10 to 500 moles, the organic lithium compound is used in an amount of 5 to 200 moles, and the carbon disulfide or phenyl isothiocyanate is used in an amount of 0.1 to 500 moles per mol of the soluble cobalt compound.

8. A process as claimed in claim 1, wherein the polymerization medium is selected from the group consisting of aromatic hydrocarbons, aliphatic hydrocarbons, and alicyclic hydrocarbons.

9. A process as claimed in claim 8, wherein the polymerization medium is selected from benzene, toluene, xylene, hexane, heptane, butane, butene, cyclohexane, and cyclopentane.

10. A process as claimed in claim 1, wherein the polymerization medium has a moisture content of up to 50 ppm.

11. A process as claimed in claim 1, wherein 1,3-butadiene is contained in the polymerization medium in a concentration of 5% to 30% by weight.

12. A process as claimed in claim 1, wherein polymerization is carried out at a temperature of −10° C. to 80° C.

13. A process as claimed in claim 1, wherein polymerization is carried out under atmospheric pressure or a higher pressure.

14. A process for preparing a rubber with an enhanced mechanical strength containing 5% to 30% by weight of boiling n-hexane-insoluble fraction, comprising the successive steps of:
(A) polymerizing 1,3-butadiene, isoprene, or a mixture of styrene and 1,3-butadiene in the presence of a catalyst consisting of an organic lithium compound to obtain a rubber; and
(B) polymerizing 1,3-butadiene in the polymerization system, in the presence of a 1,2-polymerization catalyst consisting essentially of a soluble cobalt compound, an organic aluminum halide, an organic lithium compound, and carbon disulfide, phenyl isothiocyanate or mixtures thereof wherein the soluble cobalt compound is used in an amount of 0.005 to 0.1 mol%, the organic aluminum halide is used in an amount of 0.01 to 1 mol%, the organic lithium compound is used in an amount of 0.01 to 1 mol%, and the carbon disulfide or phenyl isothiocyanate is used in an amount of 0.001 to 1 mol%, based on the 1,3-butadiene to be polymerized.

15. A process as claimed in claim 14, where the soluble cobalt compound is selected from the goup consisting of -diketone complexes of cobalt, β-ketonic acid ester complexes of cobalt, cobalt salts of organic carboxylic acids, halogenated cobalt complexes, and cobalt complexes of olefins and diolefins.

16. A process as claimed in claim 14, wherein the organic aluminum halide is selected from the compounds of the general formula

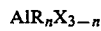

in which R is an alkyl, aryl, or cycloalkyl radical, X is a halogen atom, and n is a number of 1 to 2.

17. A process as claimed in claim 14, wherein the organic lithium compound is selected from the group consisting of alkyl lithium compounds, aryl lithium compounds, alkylene dilithium compounds, and arylene dilithium compounds.

18. A process as claimed in claim 14, wherein carbon disulfide is employed as a component of the catalyst.

19. A process as claimed in claim 14, wherein the organic aluminum halide or the organic lithium compound is added to the polymerization medium containing dissolved 1,3-butadiene and the soluble cobalt compound and then the carbon disulfide.

20. A process as claimed in claim 14, wherein the organic aluminum halide is used in an amount of 10 to 500 moles, the organic lithium compound is used in an amount of 5 to 200 moles, and the carbon disulfide or phenyl isothiocyanate is used in an amount of 0.1 to 500 moles per mol of the soluble cobalt compound.

21. A process as claimed in claim 14, wherein the polymerization medium is selected from the group consisting of aromatic hydrocarbons, aliphatic hydrocarbons, and alicyclic hydrocarbons.

22. A process as claimed in claim 21, wherein the polymerization medium is selected from benzene, toluene, xylene, hexane, heptane, butane, butene, cyclohexane, and cyclopentane.

23. A process as claimed in claim 14, wherein the polymerization medium has a moisture content of up to 50 ppm.

24. A process as claimed in claim 14, wherein 1,3-butadiene is contained in the polymerization medium in a concentration of 5% to 30% by weight.

25. A process as claimed in claim 14, wherein polymerization is carried out at a temperature of -10% to 80° C.

26. A process as claimed in claim 14, wherein polymerization is carried out under atmospheric pressure or a higher pressure.

* * * * *